(12) United States Patent
Tsuchiya (10) Patent No.: US 9,314,916 B2
(45) Date of Patent: Apr. 19, 2016

(54) POWER TOOL

(71) Applicant: MAKITA CORPORATION, Aichi (JP)

(72) Inventor: Tadayoshi Tsuchiya, Anjo (JP)

(73) Assignee: MAKITA CORPORATION, Aichi (JP)

( * ) Notice: Subject to any disclaimer, the term of this patent is extended or adjusted under 35 U.S.C. 154(b) by 531 days.

(21) Appl. No.: 13/783,895

(22) Filed: Mar. 4, 2013

(65) Prior Publication Data
US 2013/0248216 A1 Sep. 26, 2013

(30) Foreign Application Priority Data

Mar. 23, 2012 (JP) ................................. 2012-066771

(51) Int. Cl.
*B25F 5/02* (2006.01)
*A01G 3/053* (2006.01)

(52) U.S. Cl.
CPC .. *B25F 5/02* (2013.01); *A01G 3/053* (2013.01)

(58) Field of Classification Search
CPC ............. B25F 5/02; B25F 1/04; A01G 3/053; A01G 3/0475; A01G 2003/0461; A01D 75/20; B26B 19/063; B26B 19/066; F16D 11/10; F16D 11/14
USPC ........... 30/199, 197, 296.1; 173/18; 192/69.7, 192/69.63, 108
See application file for complete search history.

(56) References Cited

U.S. PATENT DOCUMENTS

| | | | | |
|---|---|---|---|---|
| 4,760,646 A | * | 8/1988 | Siegler ..................... | A01G 3/08 30/275.4 |
| 4,916,818 A | * | 4/1990 | Panek ..................... | A01G 3/08 30/296.1 |
| 7,162,804 B2 | | 1/2007 | Matsuura | |
| 7,992,308 B1 | * | 8/2011 | Fisher ..................... | A01G 3/053 188/381 |
| 2002/0042997 A1 | * | 4/2002 | Uhl ........................... | A01G 3/08 30/382 |
| 2002/0194739 A1 | * | 12/2002 | Krane ..................... | A01G 3/08 30/296.1 |

(Continued)

FOREIGN PATENT DOCUMENTS

| | | |
|---|---|---|
| DE | 102005053416 | 5/2007 |
| EP | 0365703 | 5/1990 |

(Continued)

OTHER PUBLICATIONS

Common Information about Centrifugal Clutches—Wikipedia entry of Centrifugal Clutch, retrieved Aug. 26, 2015, 3 pages.*

(Continued)

*Primary Examiner* — Thanh Truong
*Assistant Examiner* — Thomas M Wittenschlaeger
(74) *Attorney, Agent, or Firm* — Greenblum & Bernstein, P.L.C.

(57) ABSTRACT

A power tool comprising a hollow pole, a prime mover disposed at one end of the pole, a tool disposed at the other end of the pole, a transmission shaft rotatably disposed within the pole and configured to transmit torque from the prime mover to the tool, a joint mechanism configured to support the tool such that the tool is capable of rotating with respect to the pole, a lock mechanism configured to selectively lock and unlock the joint mechanism, and a clutch mechanism disposed on a pathway of torque transmission from the prime mover to the tool via the transmission shaft, and configured to selectively connect and disconnect the pathway of torque transmission. The lock and clutch mechanisms are coupled with each other such that the clutch mechanism disconnects the pathway of torque transmission when the lock mechanism unlocks the joint mechanism.

12 Claims, 10 Drawing Sheets

(56) References Cited

U.S. PATENT DOCUMENTS

| | | | |
|---|---|---|---|
| 2003/0110645 A1* | 6/2003 | Phillips | B23D 49/11 30/392 |
| 2004/0237317 A1 | 12/2004 | Matsuura | |
| 2007/0000138 A1 | 1/2007 | Baskar et al. | |
| 2007/0193038 A1 | 8/2007 | Dahlberg | |
| 2009/0100684 A1* | 4/2009 | Doragrip | A01G 3/053 30/216 |
| 2010/0101096 A1* | 4/2010 | Yamaoka | A01G 3/053 30/199 |

FOREIGN PATENT DOCUMENTS

| | | |
|---|---|---|
| EP | 0834248 | 4/1998 |
| GB | 2399269 | 9/2004 |
| JP | 63-158119 | 10/1988 |
| JP | 01-243923 | 9/1989 |
| JP | 2004-267148 | 9/2004 |
| JP | 2006-506088 | 2/2006 |
| JP | 2006/101798 | 4/2006 |
| JP | 2007-536929 | 12/2007 |
| JP | 2010-233553 | 10/2010 |
| WO | 2004/045269 | 6/2004 |
| WO | 2005/110062 | 11/2005 |
| WO | 2007/051553 | 5/2007 |

OTHER PUBLICATIONS

Japanese Office Action for JP2012-0066771 mailed on Apr. 28, 2015, along with English-language translation thereof.

Search report from E.P.O., mail date is Oct. 17, 2013.

\* cited by examiner

POWER TOOL

CROSS-REFERENCE TO RELATED APPLICATION

This application claims priority to Japanese Patent Application No. 2012-066771 filed on Mar. 23, 2012, the contents of which are hereby incorporated by reference into the present application.

TECHNICAL FIELD

The present teachings relate to a power tool, and more particularly, relate to a power tool including a tool and a prime mover disposed at both ends of a hollow pole, respectively.

DESCRIPTION OF RELATED ART

JP 2007-536929 A discloses a power tool called a pole hedge cutter. The power tool includes a hollow pole, a prime mover disposed at one end of the hollow pole, and a tool disposed at the other end of the hollow pole. The tool is supported via a joint mechanism so as to be capable of rotating with respect to the hollow pole between a for-use position and a storage position.

BRIEF SUMMARY OF INVENTION

The above-described existing power tool is configured such that, when the tool is in the storage position, the tool is mechanically fixed. With this configuration, even when a throttle is operated by mistake, an error operation of the tool hi the storage position may be prevented. However, when the prime mover is operated with the tool mechanically fixed, a large load might be applied to the prime mover and a gear.

In one aspect of the present teachings, it is preferable that a power tool includes a hollow pole, a prime mover disposed at one end of the hollow pole, a tool disposed at the other end of the hollow pole, a transmission shaft disposed within the hollow pole in a rotatable manner and configured to transmit torque from the prime mover to the tool, a joint mechanism configured to support the tool such that the tool is capable of rotating with respect to the hollow pole, a lock mechanism configured to selectively lock and unlock the joint mechanism, and a clutch mechanism disposed on a pathway of torque transmission from the prime mover to the tool via the transmission shaft, and configured to selectively connect and disconnect the pathway of torque transmission.

It is preferable that the lock mechanism and the clutch mechanism are coupled with each other. It is also preferable that the clutch mechanism is configured to disconnect the pathway of torque transmission when the lock mechanism unlocks the joint mechanism. With the above-described configuration, when a user unlocks the lock of the joint mechanism, torque transmission from the prime mover to the tool is disconnected in conjunction with the user's unlock operation. Thus, even when the prime mover is operated by mistake, torque of the prime mover is not transmitted to the tool, and therefore, the tool is not driven. In this case, the prime mover may be idled, and thus, only a small load is put on the prime mover and the gear.

According to one embodiment, it is preferable that the joint mechanism is configured to support the tool such that the tool is capable of rotating between a for-use position and a storage position with respect to the hollow pole. In this case, it is preferable that, when the tool is in the for-use position, the clutch mechanism connects the pathway of torque transmission when the lock mechanism locks the joint mechanism. On the other hand, it is preferable that, when the tool is in the storage position, the clutch mechanism keeps disconnecting the pathway of torque transmission even when the lock mechanism locks the joint mechanism. With the above-described configuration, when the tool is in the storage position, driving of the tool by mistake may be prevented.

DETAILED DESCRIPTION OF INVENTION

In one embodiment of the present teachings, it is preferable that a lock mechanism includes a lock member configured to be capable of moving at least to a lock position and an unlock position. In this case, it is preferable that the lock mechanism is configured to lock a joint mechanism when the lock member is in the lock position, and to unlock the joint mechanism when the lock member is in the unlock position. In addition, it is preferable that a clutch mechanism is configured to connect a pathway of torque transmission when the lock member is in the lock position, and to disconnects the pathway of torque transmission when the lock member is in the unlock position. According to this configuration, when a user operates the lock member to unlock the joint mechanism, the clutch mechanism automatically disconnects the pathway of torque transmission from the prime mover to the tool.

In the above-described embodiment, it may be preferable that the lock member (62) is configured to be capable of further moving to a second lock position. In this case, it is preferable that the lock mechanism is configured to lock the joint mechanism when the lock member is (62) in the second lock position. Additionally, it is preferable that the clutch mechanism is configured to disconnect the pathway of torque transmission when the lock member is in the second lock position.

In the above-described embodiment, it may be preferable that the joint mechanism is configured to support the tool such that the tool is capable of rotating between a for-use position and a storage position with respect to the hollow pole. In this case, it is preferable that the lock member is configured to become able to move between the lock position and the unlock position when the tool is in the for-use position. Additionally, it is preferable that the lock member is configured to become able to move between the second lock position and the unlock position and to becomes unable to move the lock position when the tool is in the storage position. According to this configuration, when the tool is in the storage position, driving of the tool may be prevented even in a case where the prime mover is mistakenly driven. In one embodiment, the second lock position may be, for example, an intermediate position between the lock position and the unlock position.

In the above-described embodiment, it is preferable that the lock mechanism further includes a lock receiving member configured to engage with the lock member to lock the joint mechanism. In this case, it is preferable that the lock receiving member includes a first receiving portion and a second receiving portion. The first receiving portion is configured to receive the lock member when the tool is in the for-use position. Therefore, the first receiving portion may preferably have a shape to allow the lock member to move to the lock position. On the other hand, the second receiving portion is configured to receive the lock member when the tool is in the storage position. Therefore, the second receiving portion may preferably have a shape to allow the lock member to move to the second lock position and to prohibit the lock member to move to the lock position. With this configuration, when the tool is in the for-use position, the lock mechanism is allowed to lock the joint mechanism and the clutch mechanism is allowed to connect the pathway of torque transmission. On the other hand, when the tool is in the storage position, the lock mechanism is allowed to lock the joint mechanism and the clutch mechanism is prohibited to connect the pathway of torque transmission from the prime mover to the tool.

In one embodiment of the present teachings, it is preferable that the clutch mechanism includes a pair of clutch members. In this case, it is preferable that one of the clutch members is coupled with the prime mover and the other of the clutch members is coupled with the tool, and the pair of clutch members being configured to approach toward and separate from each other to connect and disconnect the pathway of the torque transmission. Furthermore, it is preferable that the one of the clutch members is coupled with the lock member such that the pair of clutch members approach toward each other when the lock member moves from the unlock position to the lock position and the pair of clutch members separate from each other when the lock member moves from the lock position to the unlock position.

Teachings according to the present disclosure are not limited to a pole hedge trimmer, but may be employed in various types of power tools. The present teachings may be widely adopted for use in a power tool such as a blush cutter, a pole saw, and a pole hedge cutter, etc., to which a tool is attached to an end of a pole via a joint mechanism.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved power tools, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENT

Figure 1:
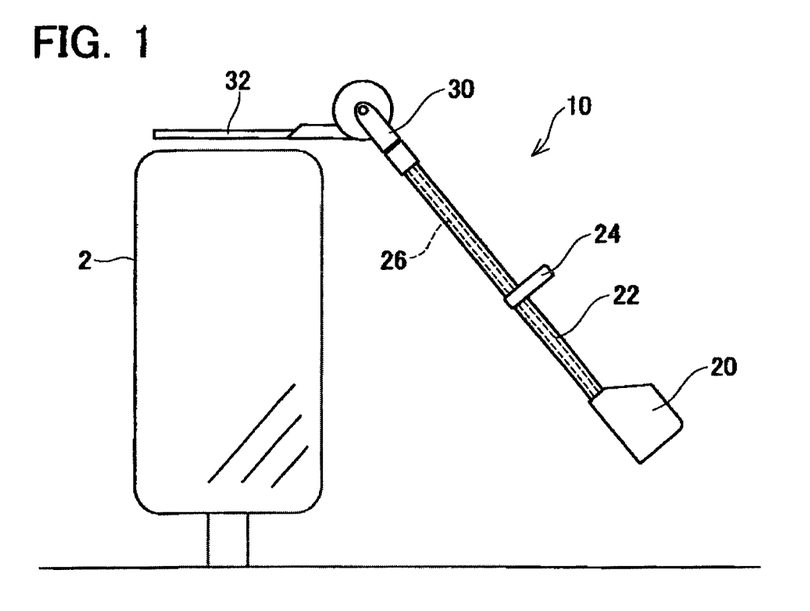
FIG. 1 is a view schematically illustrating a use-state of a power tool 10 (pole hedge trimmer) according to an embodiment.

A power tool 10 according to an embodiment will be described with reference to the accompanying drawings. As illustrated in FIG. 1, the power tool 10 is, for example, a pole hedge trimmer, i.e., a power tool for gardening which is used in trimming a hedge 2. In particular, the pole hedge trimmer may be preferably used in trimming upper part of a tall hedge and the like in a range which is difficult to reach by a user (not illustrated).

Figure 2:
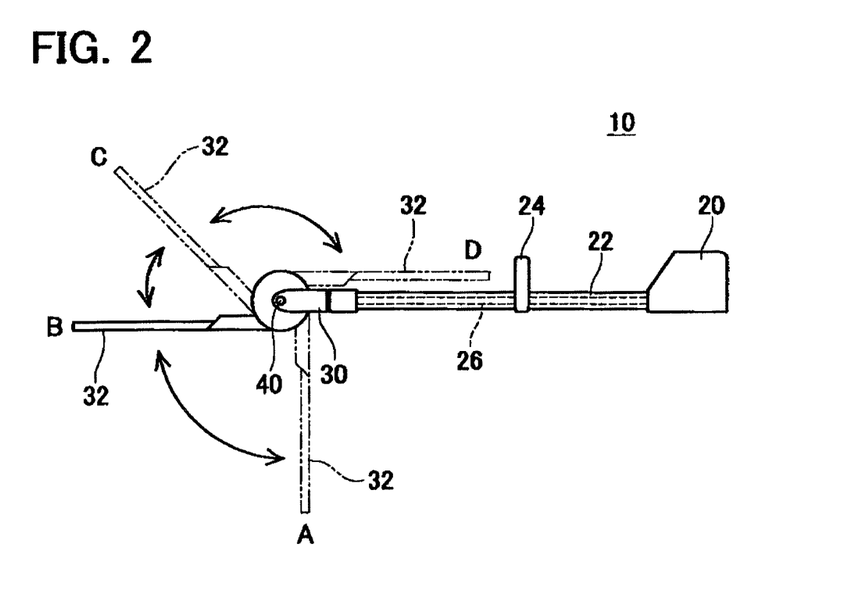
FIG. 2 is a view schematically illustrating the power tool 10 according to the embodiment.

As illustrated in FIG. 1 and FIG. 2, the power tool 10 includes a hollow pole 22, a prime mover 20 disposed at one end of the hollow pole 22, and a head unit 30 disposed on the other end of the hollow pile 22. The prime mover 20 is, for example, a gasoline-fueled engine. Note that the prime mover 20 is not limited to an engine, but may be, for example, an electric motor. The head unit 30 includes a blade assembly 32 as a tool. The blade assembly 32 includes a pair of shear blades having comb-shaped blade edges (see, for example, FIG. 3 and FIG. 4). The blade assembly 32 is driven by the prime mover 20.

As illustrated in FIG. 2, a transmission shaft 26 is disposed within the hollow pole 22 in a rotatable manner. One end of the transmission shaft 26 is coupled with the prime mover 20, and the other end of the transmission shaft 26 is coupled with the head unit 30. The transmission shaft 26 transmits torque from the prime mover 20 to the head unit 30 including the blade assembly 32. The hollow pole 22 is provided with a handle 24 that a user holds. The handle 24 is provided with a throttle (not illustrated) used for adjusting output of the prime mover 20.

As illustrated in FIG. 2, the head unit 30 includes a joint mechanism 40. The joint mechanism 40 supports the blade assembly 32 such that the blade assembly 32 is capable of rotating with respect to the hollow pole 22. The blade assembly 32 is allowed to rotationally move by the joint mechanism 40 between for-use positions A, B, and C and a storage position D. The user may adjust a position of the blade assembly 32 according to an angle of a surface of the hedge 2 to be trimmed between the for-use positions A, B, and C. Also, when the user transports or stores the power tool 10, the blade assembly 32 may be caused to move to the storage position D for convenience. When the blade assembly 32 is in the storage position D, the blade assembly 32 is arranged along the hollow pole 22, and an entire length of the power tool 10 is shortened.

Figure 3:
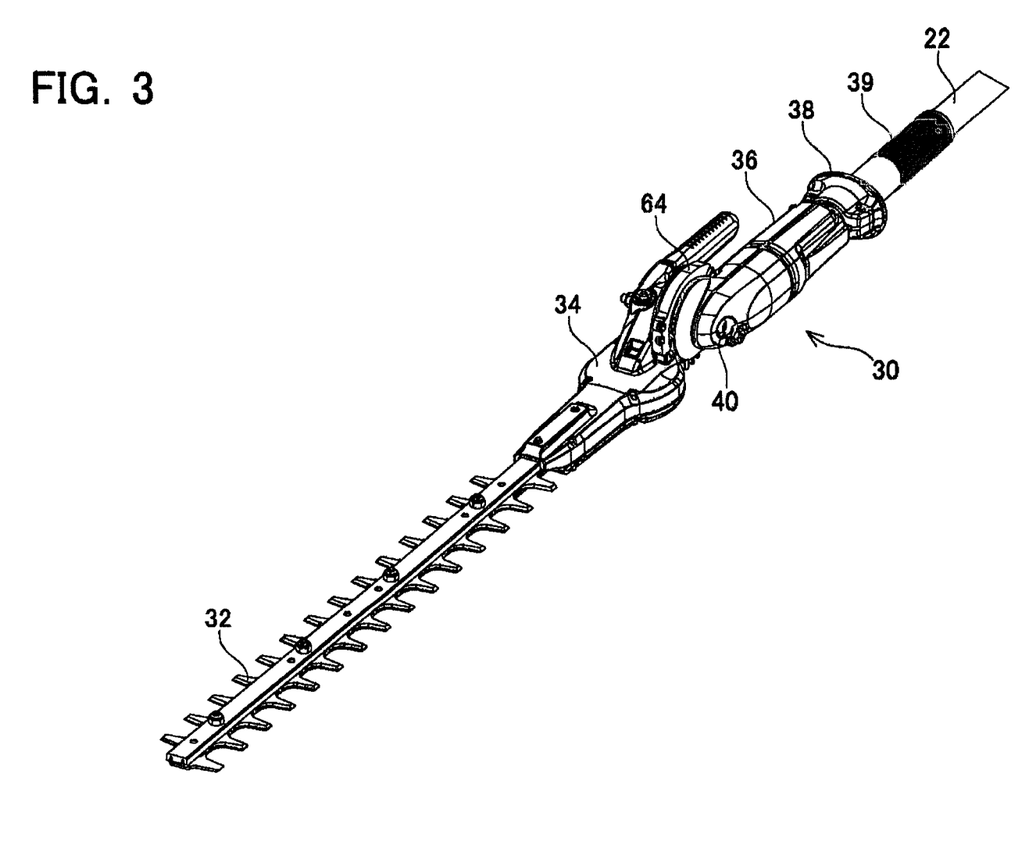
FIG. 3 is a view illustrating a head unit 30 when a blade assembly 32 is in a for-use position.
Figure 4:
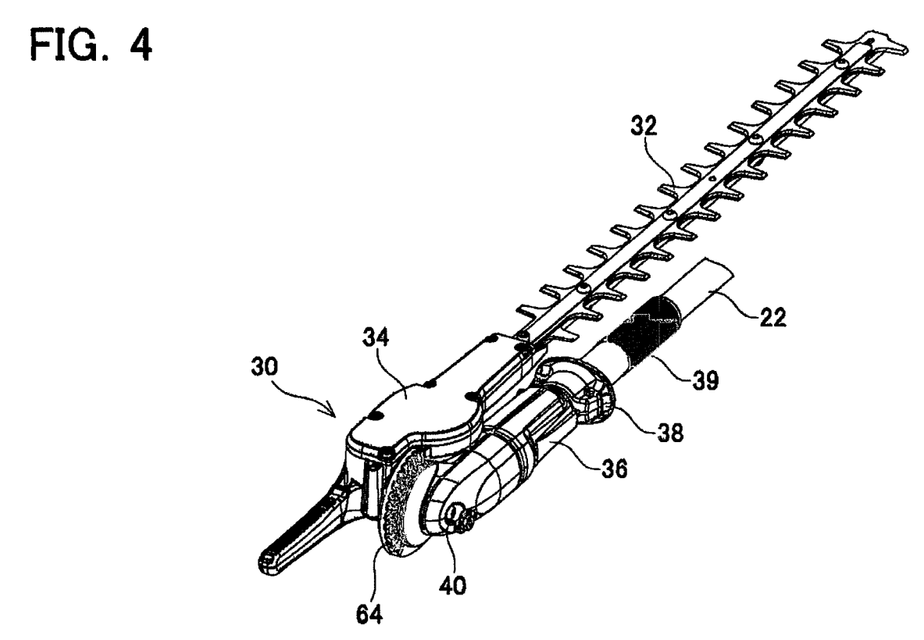
FIG. 4 is a view illustrating the head unit 30 when the blade assembly 32 is in a storage position.

As illustrated in FIG. 3 and FIG. 4, the head unit 30 includes a blade holder 34 configured to hold the blade assembly 32 such that the blade assembly 32 is removable, and a fixed housing 36 fixed to the hollow pole 22. The blade holder 34 and the fixed housing 36 are coupled with each other by the joint mechanism 40 so as to be capable of relatively rotating. Furthermore, the head unit 30 includes an unlock sleeve 38. The unlock sleeve 38 is attached to the hollow pole 22 and is configured to be capable of sliding along the hollow pole 22. The unlock sleeve 38 is provided with a grip 39 that the user holds. As will be described in detail later, the joint mechanism 40 is locked and unlocked by the user's operation of the unlock sleeve 38. The phrase "the joint mechanism 40 is locked" herein means that rotation of the blade assembly 32 with respect to the hollow pole 22 is prohibited, and the phrase "the joint mechanism 40 is unlocked" herein means that rotation of the blade assembly 32 with respect to the hollow pole 22 is allowed.

Figure 5:
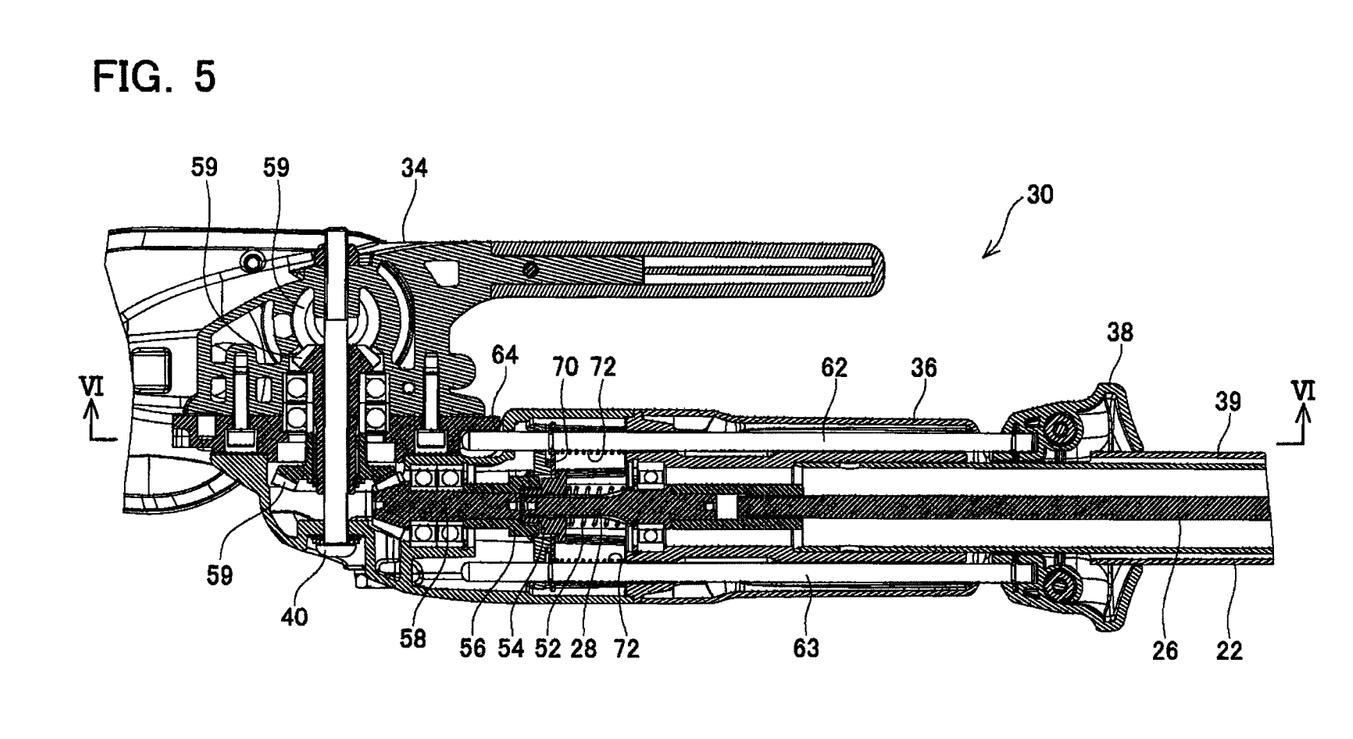
FIG. 5 is a cross-sectional view taken along the line V-V of FIG. 6, illustrating an inner structure of the head unit 30. The blade assembly 32 is in the for-use position, a joint mechanism 40 is locked, and a pair of clutch members 54 and 56 is disposed such that the clutch members 54 and 56 are capable of approaching toward each other to engage to each other.
Figure 6:
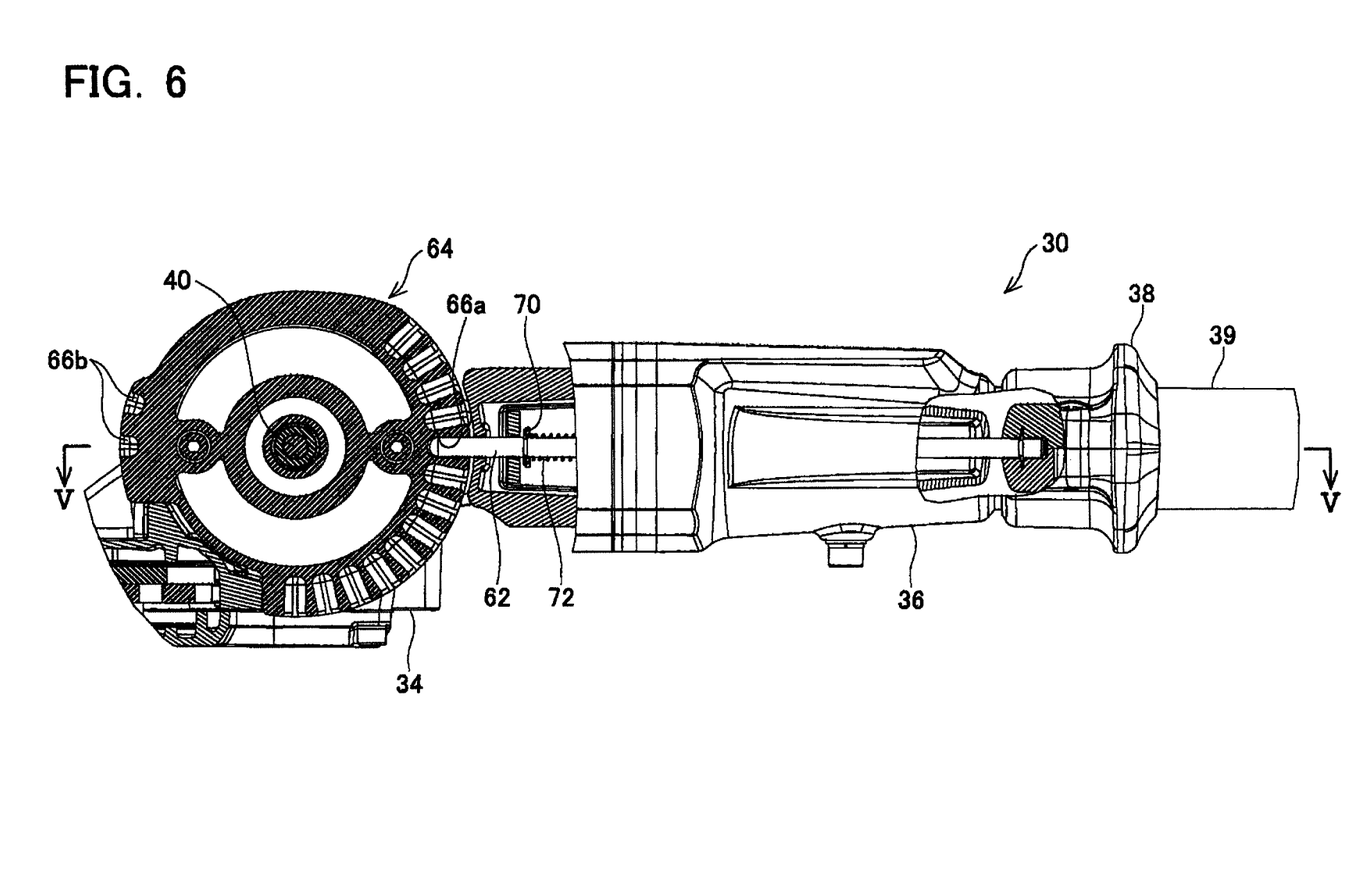
FIG. 6 is a (partial) cross-sectional view taken along the line VI-VI of FIG. 5, illustrating the inner structure of the head unit 30. The blade assembly 32 (not illustrated) is in the for-use position, the joint mechanism 40 is locked, and the pair of clutch members 54 and 56 (not illustrated) is disposed such that the clutch members 54 and 56 are capable of approaching toward each other to engage each other.

As illustrated in FIG. 5 and FIG. 6, an inner structure of the head unit 30 will be described. The head unit 30 includes a round-bar-shaped lock member 62 and a substantially disk-shaped angular plate 64. The lock member 62 is supported by the fixed housing 36. The lock member 62 is disposed in parallel to the hollow pole 22 and is configured to be capable of sliding in an axis direction of the hollow pole 22. A base end of the lock member 62 is fixed to the unlock sleeve 38, and a distal end of the lock member 62 is opposed to the angular plate 64. The lock member 62 and the unlock sleeve 38 are biased toward the angular plate 64 by a coil spring 72. In this embodiment, a round-bar-shaped support member 63 is disposed in parallel to the lock member 62. The support member 63 is also supported by the fixed housing 36 so as to be capable of sliding. The support member 63 is located at an opposite side to a side where the lock member 62 is disposed with the hollow pole 22 interposed therebetween. The support member 63 does not engage with the angular plate 64.

The angular plate 64 is fixed to the blade holder 34. The angular plate 64 is a lock receiving member configured to be capable of selectively engaging with and disengaging from the distal end of the lock member 62 relative to a circumference direction. A plurality of first receiving sections 66a and a plurality of second receiving sections 66b are formed so as to be located along the circumference direction in the angular plate 64. The first receiving sections 66a are disposed in a range opposed to the distal end of the lock member 62 when the blade assembly 32 is in the for-use position A, B or C (see, for example, FIG. 2). On the other hand, the second receiving sections 66b are disposed in a range opposed to the distal end of the 62 when the blade assembly 32 is in the storage position D (see, for example, FIG. 2). Each of the first receiving sections 66a and the second receiving sections 66b is a trench capable of receiving the distal end of the lock member 62. In FIG. 5 and FIG. 6, the distal end of the lock member 62 is inserted in one of the first receiving sections 66a. In this state, the joint mechanism 40 is locked. The position of the lock member 62 illustrated in FIG. 5 and FIG. 6 is herein referred to as a lock position.

Figure 7:
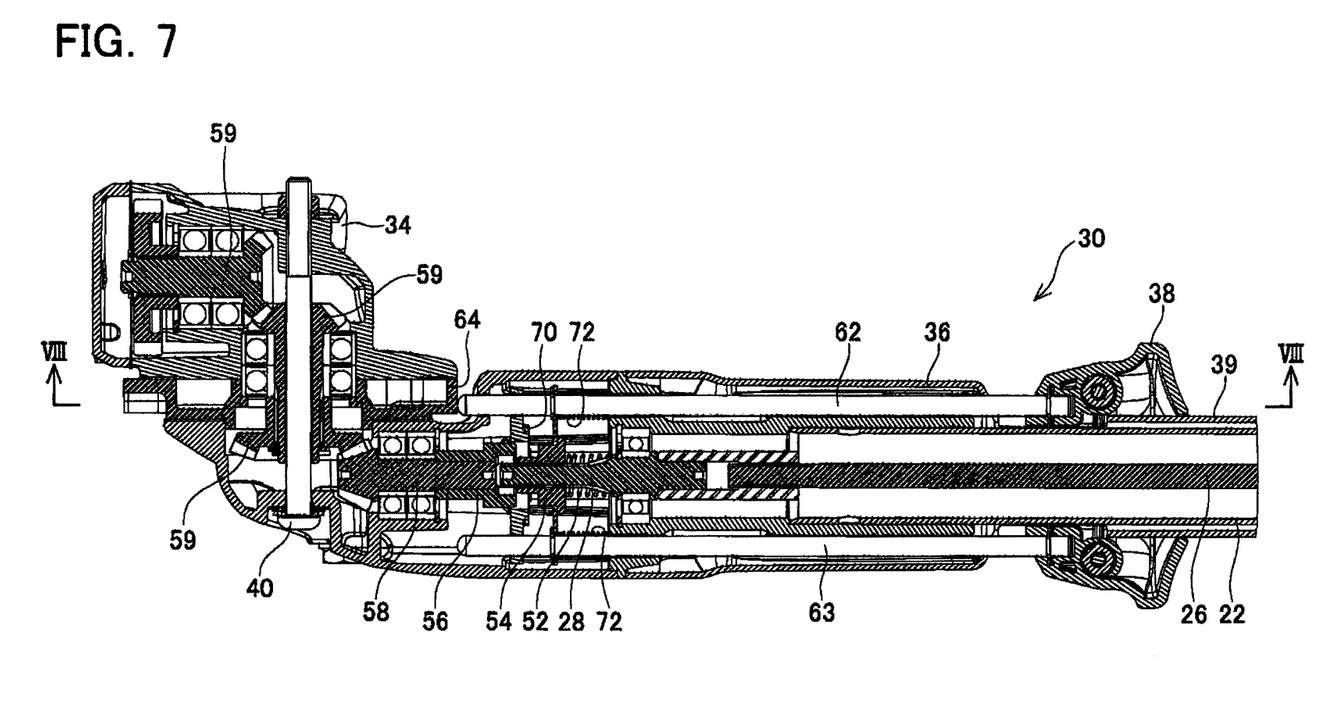
FIG. 7 is a cross-sectional view taken along the line VII-VII of FIG. 8, illustrating the inner structure of the head unit 30. The blade assembly 32 (not illustrated) is in an intermediate position between the for-use position and the storage position, the joint mechanism 40 is unlocked, and the pair of clutch members 54 and 56 is disposed such that the clutch members 54 and 56 separate from each other.
Figure 8:
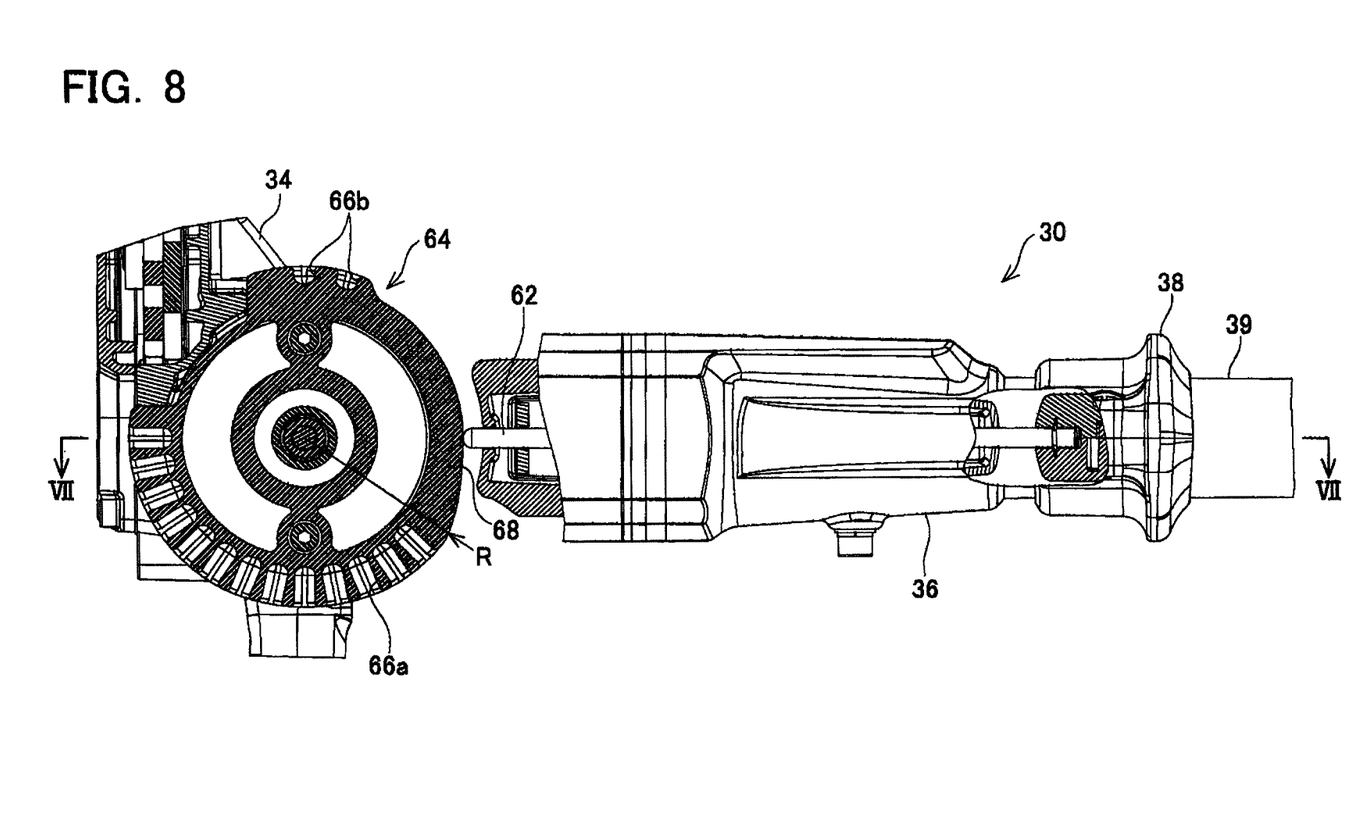
FIG. 8 is a (partial) cross-sectional view taken along the line VIII-VIII of FIG. 7, illustrating the inner structure of the head unit 30. The blade assembly 32 (not illustrated) is in an intermediate position between the for-use position and the storage position, the joint mechanism 40 is unlocked, and the pair of clutch members 54 and 56 is disposed such that the clutch members 54 and 56 separate from each other.

As illustrated in FIG. 7 and FIG. 8, the user may unlock the joint mechanism 40 by operating the unlock sleeve 38. That is, when the user pulls the unlock sleeve 38 along the hollow pole 22, the lock member 62 moves to separate from the angular plate 64, and the distal end of the lock member 62 separates from the first receiving sections 66a (or the second receiving sections 66b) of the angular plate 64. As a result, the joint mechanism 40 is unlocked, and rotation of the blade assembly 32 with respect to the hollow pole 22 is allowed. The position of the lock member 62 in this state is herein referred to an unlock position. In FIG. 7 and FIG. 8, the blade assembly 32 is located in an intermediate range between the for-use position and the storage position. In this case, the distal end of the lock member 62 contacts an outer circumference surface 68 of the angular plate 64. At least a part of the outer circumference surface 68 is a radius varying part in which a radius R of the joint mechanism 40 from a central axis gradually reduces from a side where the first receiving sections 66a are disposed to a side where the second receiving sections 66b are disposed. With this configuration, when the blade assembly 32 is in the intermediate range between the for-use position and the storage position, the blade assembly 32 may be biased toward the storage position. Thus, the blade assembly 32 may be prevented from being unintentionally moved to the for-use position.

Figure 9:
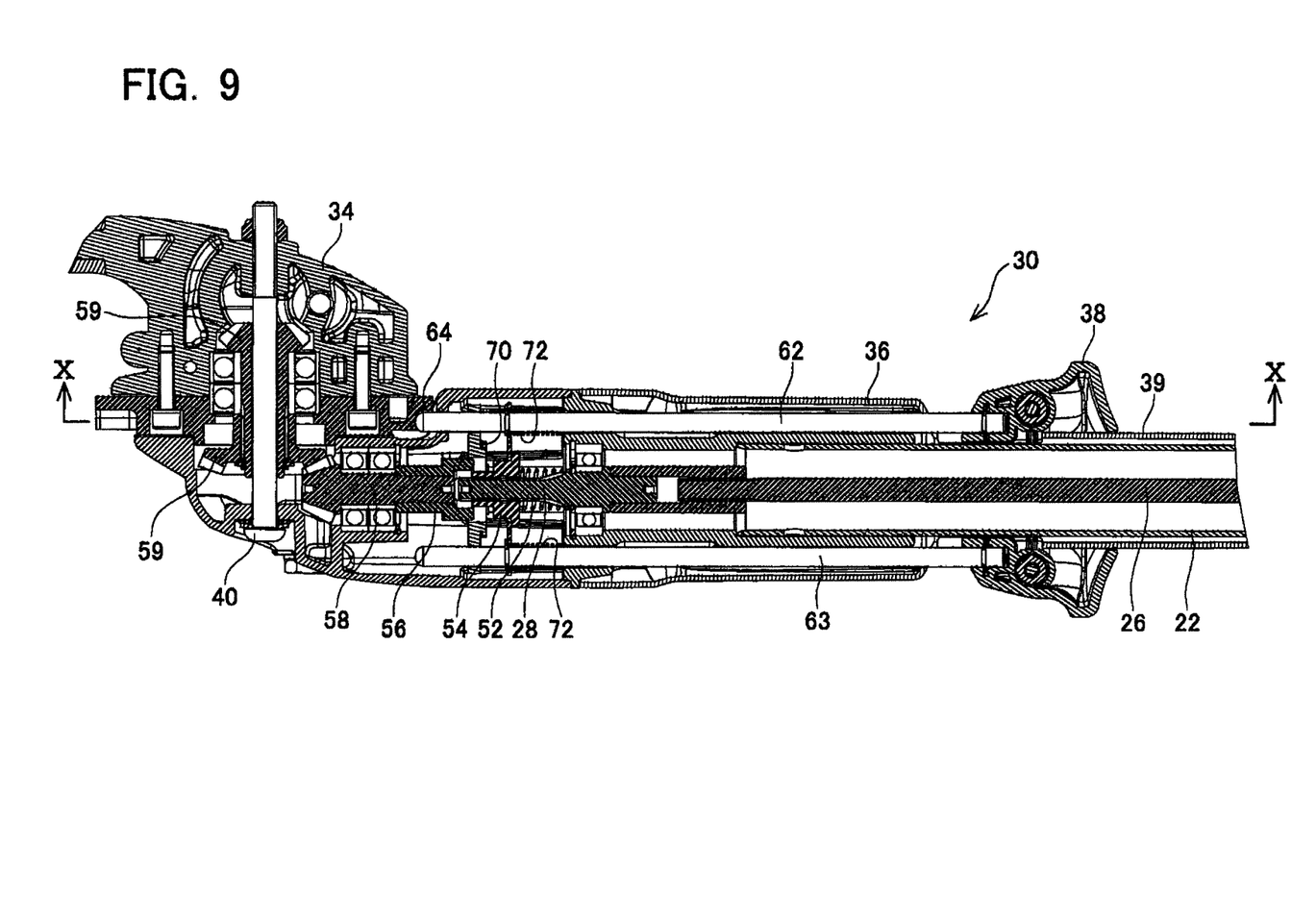
FIG. 9 is a cross-sectional view taken along the line IX-IX of FIG. 10, illustrating an inner structure of the head unit 30. The blade assembly 32 is located between storage positions, the joint mechanism 40 is locked, but the pair of clutch members 54 and 56 is disposed such that the clutch members 54 and 56 separate from each other.
Figure 10:
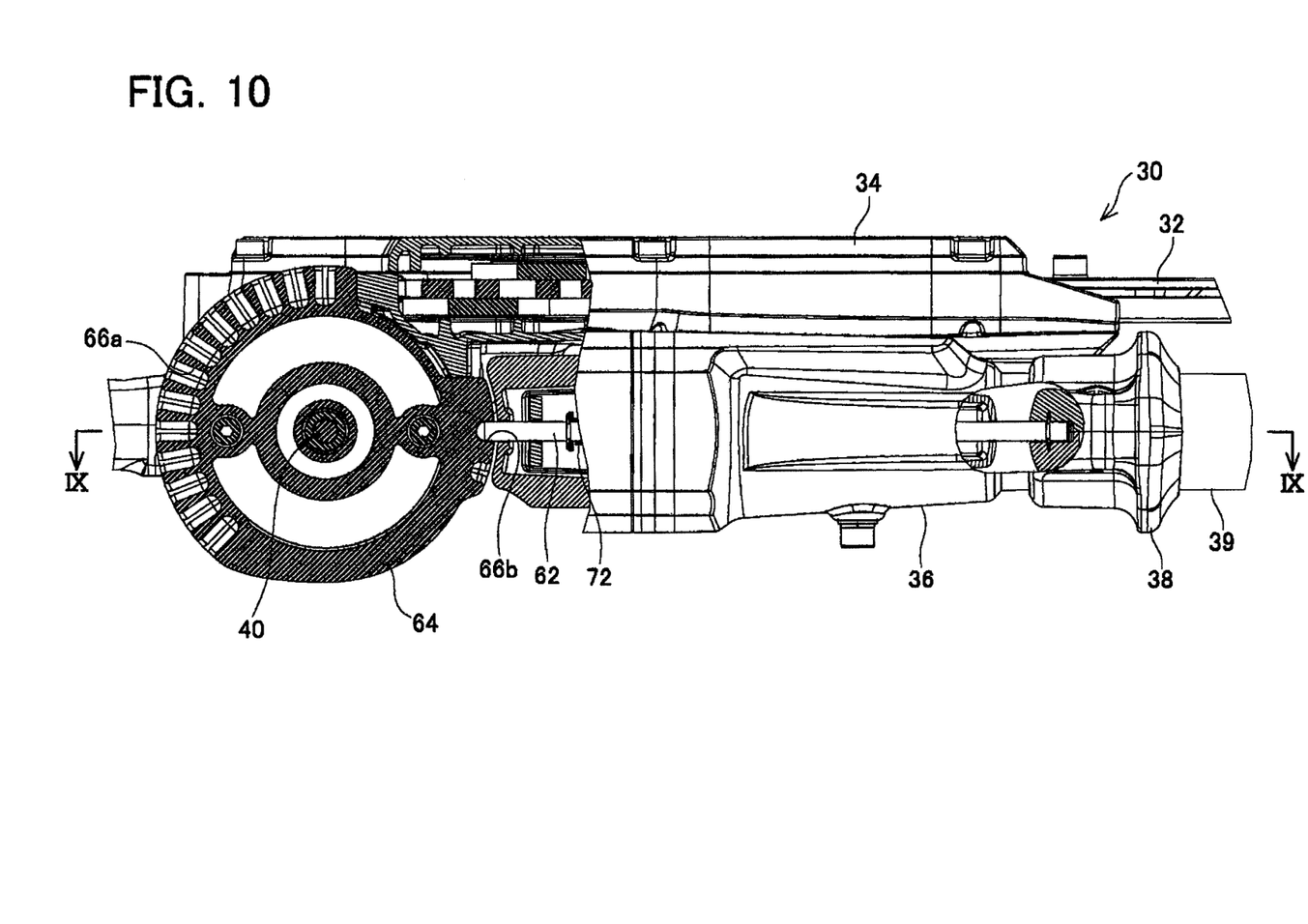
FIG. 10 is a (partial) cross-sectional view taken along the line X-X of FIG. 9, illustrating the inner structure of the head unit 30. The blade assembly 32 is between storage positions, the joint mechanism 40 is locked, but the pair of clutch members 54 and 56 (not illustrated) is disposed such that the clutch members 54 and 56 separate from each other.

As illustrated in FIG. 9 and FIG. 10, when the blade assembly 32 moves to the storage position, a distal end of the blade assembly 32 is allowed to be inserted in the second receiving section 66b of the angular plate 64. Thus, the joint mechanism 40 is locked. In this case, the second receiving section 66b has a smaller dimension in a radius direction than that of the first receiving section 66a. Thus, the lock member 62 inserted in the second receiving section 66b is not allowed to move to the lock position (see, for example, FIG. 5 and FIG. 6) and stays at an intermediate position between the lock position and the unlock position. The intermediate position is herein referred to as a second lock position. Thus, when the blade assembly 32 is in the storage position, the lock member 62 is allowed to move between the unlock position and the second lock position, and is prohibited to move to the lock position.

As described above, in the power tool 10 according to this embodiment, a user can change an angle of the blade assembly 32. It has to be avoided that the blade assembly 32 is driven when the user changes the angle of the blade assembly 32. Therefore, in the power tool 10 according to this embodiment, as described below, a clutch mechanism is provided. The clutch mechanism is disposed on a pathway of torque transmission from the prime mover 20 to the blade assembly 32 via the transmission shaft 26 and is configured to be capable of selectively connect and disconnect the pathway of torque transmission. The clutch mechanism is coupled with the lock member 62 constituting the lock mechanism described above and is configured such that the clutch mechanism disconnects the pathway of torque transmission when the lock mechanism unlocks the joint mechanism 40. An example of the clutch mechanism according to this embodiment will be hereinafter described in detail.

As illustrated in FIG. 5, FIG. 7, and FIG. 9, a pair of clutch members 54 and 56, i.e., a driving side clutch member 54 and a driven side clutch member 56, is disposed within the fixed housing 36. The driving side clutch member 54 is coupled with a part of the fixed housing 36 located closer to the transmission shaft 26, and the driven side clutch member 56 is coupled with a part of the fixed housing 36 located closer to the blade assembly 32. Specifically, a spline shaft 28 is fixed to an end of the transmission shaft 26, and the driving side clutch member 54 is attached to the spline shaft 28. The driving side clutch member 54 is capable of moving with respect to the spline shaft 28 in the axis direction and is supported with respect to the spline shaft 28 (i.e., the transmission shaft 26) so as to be incapable of rotating. The driving side clutch member 54 is biased toward the driven side clutch member 56 by a coil spring 52. On the other hand, the driven side clutch member 56 is fixed to a gear shaft 58 so as to be incapable of rotating. The gear shaft 58 is coupled with the blade assembly 32 via a plurality of intermediate gears 59. Note that the pair of the clutch members 54 and 56 (i.e., the clutch mechanism) may be disposed at any part on the pathway of torque transmission from the prime mover 20 to the blade assembly 32 via the transmission shaft 26.

Figure 11:
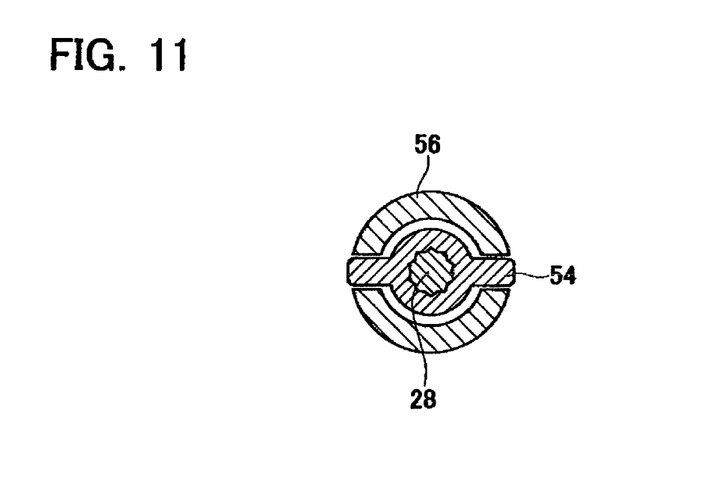
FIG. 11 is a view illustrating a cross-sectional shape of the pair of clutch members 54 and 56 vertical to a rotating shaft.

As illustrated in FIG. 5, the clutch members 54 and 56 are opposed to each other and, the clutch members 54 and 56 approach toward each other to engage with each other relative to a rotation direction. In this case, torque is transmitted from the prime mover 20 to the blade assembly 32. For reference, FIG. 11 illustrates a cross-sectional shape of the pair of clutch members 54 and 56 vertical to a rotating shaft. However, the cross-sectional shape of the clutch members 54 and 56 is not particularly limited, but may be any shape that allows the clutch members 54 and 56 to engage with each other relative to the rotational direction. On the other hand, as illustrated in FIG. 7 and FIG. 9, when the clutch members 54 and 56 separate from each other, the clutch members 54 and 56 disengage from each other. In this case, torque is not transmitted from the prime over 20 to the blade assembly 32. Thus, the clutch members 54 and 56 may connect and disconnect the pathway of torque transmission from the prime mover 20 to the blade assembly 32 by approaching toward and separating from each other.

Figure 12:
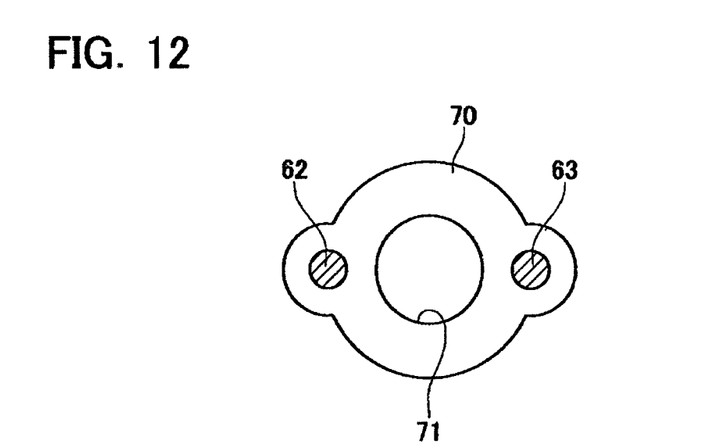
FIG. 12 is a view illustrating a planar shape of a slide plate 70.

As illustrated in FIG. 5, FIG. 7, and FIG. 9, a slide plate 70 is disposed within the fixed housing 36. As illustrated in FIG. 12, the slide plate 70 is a plate-shaped member having an opening 71. The slide plate 70 is fixed to the lock member 62 and the support member 63 and is configured to be capable of sliding with the lock member 62 and the support member 63 in the axis direction. A part (an peripheral part of the opening 71) of the slide plate 70 is located between the clutch members 54 and 56. The slide plate 70 couples the lock member 62 of the lock mechanism and the driving side clutch member 54 of the clutch mechanism together to cause the lock member 62 and the driving side clutch member 54 of the clutch mechanism to operate in conjunction with each other.

As illustrated in FIG. 5, when the lock member 62 is in the lock position, the slide plate 70 allows the clutch members 54 and 56 to engage with each other. On the other hand, as illustrated in FIG. 7, when the lock member 62 moves to the unlock position, the slide plate 70 moves the driving side clutch member 54 such that the driving side clutch member 54 separates from the driven side clutch member 56. The clutch members 54 and 56 separate from each other and thus disengage from each other. As a result, torque transmission from the prime mover 20 to the blade assembly 32 is disconnected. Moreover, as illustrated in FIG. 9, even when the lock member 62 is in the second lock position, the slide plate 70 prohibits the pair of clutch members 54 and 56 from approaching toward each other to engage with each other. As a result, torque transmission from the prime mover 20 to the blade assembly 32 is kept disconnected.

With the above-described configuration, in the power tool 10 of this embodiment, when the lock member 62 unlocks the joint mechanism 40, the pair of the clutch members 54 and 56 disconnect torque transmission form the prime mover 20 to the blade assembly 32. On the other hand, even when the lock member 62 locks the joint mechanism 40, the pair of the clutch members 54 and 56 does not necessarily connect torque transmission from the prime mover 20 to the blade assembly 32. That is, only when the blade assembly 32 is in the for-use position, the pair of clutch members 54 and 56 connects torque transmission from the prime mover 20 to the blade assembly 32. However, when the blade assembly 32 is in the storage position, the pair of clutch members 54 and 56 keeps disconnection of torque transmission to the blade assembly 32 even when the lock member 62 locks the joint mechanism 40.

In the power tool 10 of this embodiment, only when the blade assembly 32 is fixed in the for-use position, driving of the blade assembly 32 is allowed. When the blade assembly 32 is not fixed, or when the blade assembly 32 is in the storage position, driving of the blade assembly 32 is prohibited. Thus, an error operation of the blade assembly 32 may be effectively prevented.

What is claimed is:

1. A power tool, comprising:
a hollow pole;
a prime mover disposed at one end of the hollow pole;
a tool disposed at a other end of the hollow pole;
a transmission shaft disposed within the hollow pole in a rotatable manner and configured to transmit torque from the prime mover to the tool;
a joint mechanism configured to support the tool such that the tool is capable of rotating with respect to the hollow pole;
a lock mechanism configured to selectively lock and unlock the joint mechanism; and
a clutch mechanism disposed on a pathway of torque transmission from the prime mover to the tool via the transmission shaft, and configured to selectively connect and disconnect the pathway of torque transmission, wherein
the lock mechanism and the clutch mechanism are coupled with each other such that when the lock mechanism unlocks the joint mechanism the lock mechanism causes the clutch mechanism to disconnect the pathway of torque transmission.

2. The power tool as in claim 1, wherein
the lock mechanism comprises a lock member configured to move to at least a lock position and an unlock position,
the lock mechanism is configured to lock the joint mechanism when the lock member is in the lock position, and to unlock the joint mechanism when the lock member is in the unlock position, and
the clutch mechanism is configured to connect the pathway of torque transmission when the lock member is in the lock position, and to disconnect the pathway of torque transmission when the lock member is in the unlock position.

3. The power tool as in claim 2, wherein
the lock member is configured to move to a second lock position,
the lock mechanism is configured to lock the joint mechanism when the lock member is in the second lock position, and
the clutch mechanism is configured to disconnect the pathway of torque transmission when the lock member is in the second lock position.

4. The power tool as in claim 3, wherein
the joint mechanism supports the tool such that the tool is rotatable between a for-use position and a storage position with respect to the hollow pole,
the lock member is configured to move between the lock position and the unlock position when the tool is in the for-use position, and
the lock member is configured to move between the second lock position and the unlock position and to be unable to move to the lock position when the tool is in the storage position.

5. The power tool as in claim 4, wherein
the lock mechanism further comprises a lock receiving member configured to engage with the lock member to lock the joint mechanism,
the lock receiving member comprises a first receiving portion and a second receiving portion,
the first receiving portion is configured to receive the lock member when the tool is in the for-use position, and has a shape to allow the lock member to move to the lock position, and
the second receiving portion is configured to receive the lock member when the tool is in the storage position, and has a shape to allow the lock member to move to the second lock position and to prohibit the lock member to move to the lock position.

6. The power tool as in claim 5, wherein the second lock position is an intermediate position between the lock position and the unlock position.

7. The power tool as in claim 6, wherein
the clutch mechanism comprises a pair of clutch members, one of the clutch members is coupled with the prime mover and the other of the clutch members is coupled with the tool, and the pair of clutch members being configured to approach toward and separate from each other to connect and disconnect the pathway of the torque transmission,
the one of the clutch members is coupled with the lock member such that the pair of clutch members approach toward each other when the lock member moves from the unlock position to the lock position and the pair of clutch members separate from each other when the lock member moves from the lock position to the unlock position.

8. The power tool as in claim 3, wherein the second lock position is an intermediate position between the lock position and the unlock position.

9. The power tool as in claim 2, wherein
the clutch mechanism comprises a pair of clutch members, one of the clutch members is coupled with the prime mover and the other of the clutch members is coupled with the tool, and the pair of clutch members being configured to approach toward and separate from each other to connect and disconnect the pathway of the torque transmission,
the one of the clutch members is coupled with the lock member such that the pair of clutch members approach toward each other when the lock member moves from the unlock position to the lock position and the pair of clutch members separate from each other when the lock member moves from the lock position to the unlock position.

10. The power tool as in claim 1, wherein
the joint mechanism supports the tool such that the tool is rotatable between a for-use position and a storage position with respect to the hollow pole,
when the tool is in the for-use position, the clutch mechanism is configured to connect the pathway of torque transmission when the lock mechanism locks the joint mechanism, and
when the tool is in the storage position, the clutch mechanism is configured to disengage the pathway of torque transmission even when the lock mechanism locks the joint mechanism.

11. The power tool as in claim 1, wherein
the lock mechanism and the clutch mechanism are operatively coupled via an engagement member, and
when the lock mechanism moves to an unlocked position and unlocks the joint mechanism, the engagement member moves the clutch mechanism to disconnect the pathway of torque transmission.

12. The power tool as in claim 11, wherein
the engagement member is a slide plate,
the slide plate is fixed to the lock mechanism and is configured to slide with the lock mechanism, and
a part of the slide plate is located between clutch members of the clutch mechanism, and
when the lock mechanism slides to the unlocked position, the slide plate causes the clutch members to disengage from each other to disconnect the pathway of torque transmission.

* * * * *